ETCHING PROCESS

Filed July 18, 1963 2 Sheets-Sheet 1

INVENTOR.
JESSE DAVIS

BY

ALAN K. ROBERTS
ATTORNEY

ETCHING PROCESS

Filed July 18, 1963 2 Sheets-Sheet 2

INVENTOR.
JESSE DAVIS

BY

ALAN K. ROBERTS
ATTORNEY

United States Patent Office
3,290,191
Patented Dec. 6, 1966

3,290,191
ETCHING PROCESS
Jesse Davis, 196 S. Kilburn Road, Garden City, N.Y.
Filed July 18, 1963, Ser. No. 295,948
1 Claim. (Cl. 156—3)

This invention relates to methods for coating substrates with predetermined patterns of electrically conductive materials and relates more particularly to etching procedures for providing said patterns.

There is currently a substantial demand for products in which a precise pattern of electrically conductive material is secured to a substrate in the form of a coating. Where the substrate is a ceramic, certain problems occur and various techniques have been developed to cope with these problems.

With regard to one specific type of product, a technique has evolved in accordance with which a small ceramic body is coated with gold which is in turn coated with a photo-sensitive acid resist. This resist is then exposed photographically to a photographic negative of the desired pattern and conventional wet techniques are then employed to lay bare selected areas of the gold coating which are then treated with a corrosive such as aqua regia.

While the above procedure is well suited for a laboratory and for small scale production, it has not been found possible to employ this technique for the mass production of small items. One of the principal difficulties in this respect is caused by the need for subjecting each of a multitude of small bodies to photographic exposure and development and then to a time consuming wet procedure for removal of portions of the acid resist.

I have now found that I can make a master tool, etched by photographic or other techniques, capable of treating one or a multitude of products simultaneously in a manner which avoids the need for chemically removing acid resist.

More particularly, considering a gold plated ceramic body, by way of example, coated with an acid resist, I fill the pattern in the aforesaid master tool with an abrasive resist which I then transfer to the acid resist coating and I then propel an abrasive at the partially shielded acid resist to erode the same according to said pattern. I then remove the thusly exposed gold with a suitable caustic.

It has been found that the substitution of a mastei tool for direct photographic exposure and the substitution of mechanical abrasion for the chemical removal of the acid resist result in a substantial savings of time and labor and therefore in greatly reduced costs.

Preparation of the master tool requires at most one photographic step whereafter the tool may be repeatedly used in production.

The use of a dry abrasive technique not only avoids the need for costly chemicals, but as well simplifies the equipment required and provides the conveniences inherent in dry processes as compared to wet.

A further significant advantage of the process to be disclosed hereinafter in greater detail is that it precludes the undercutting of the acid resist and therefore insures greater accuracy of reproduction.

Objects and features of the invention, as well as advantages thereof, will become apparent from the following detailed description of some preferred embodiments as illustrated in the accompanying drawing in which.

Figure 3:
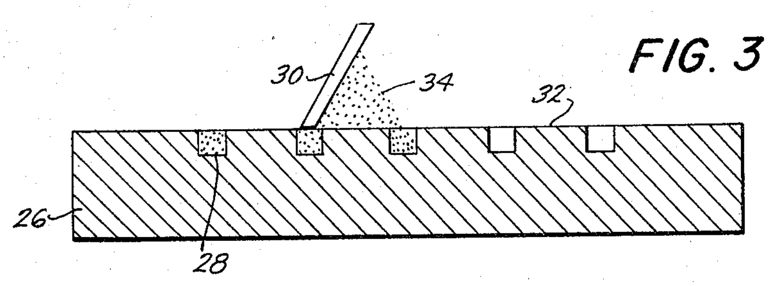
Figure 4:
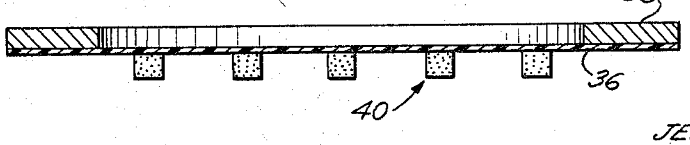
Figure 5:
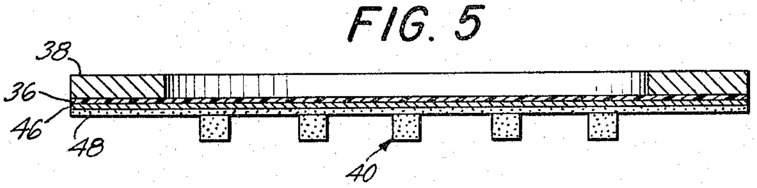
Figure 6:
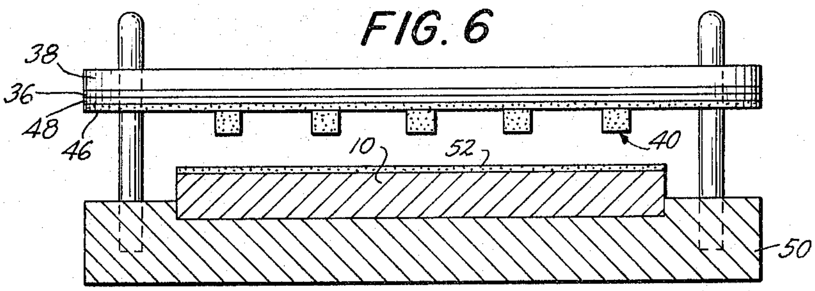
Figure 7:
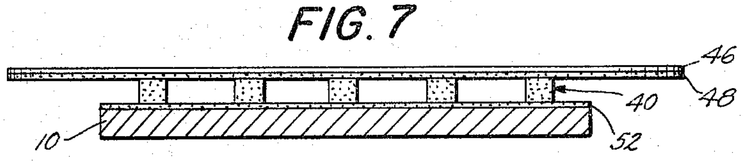
Figure 8:
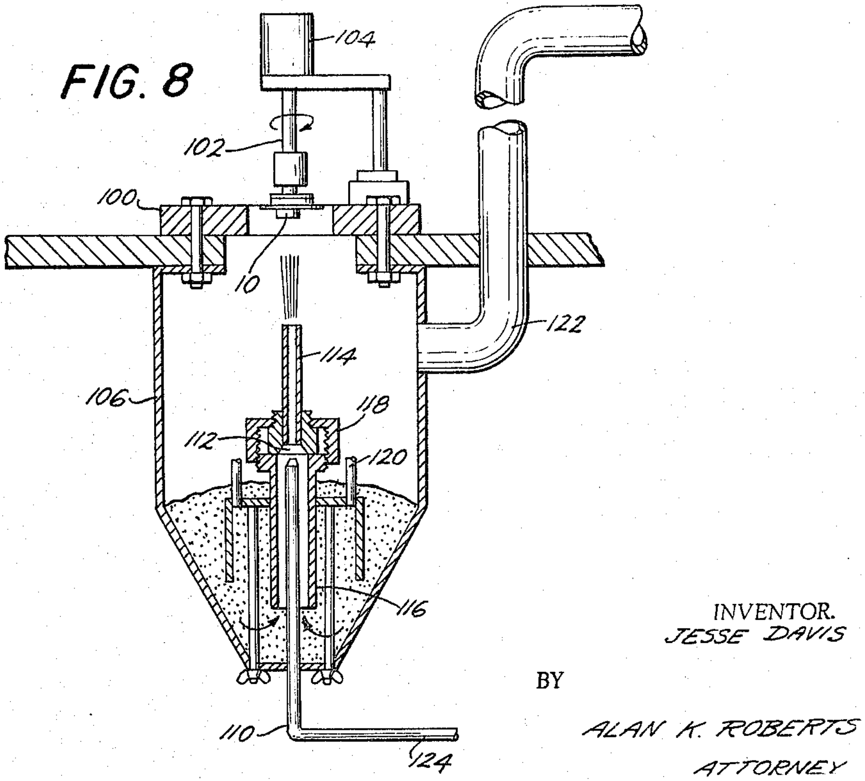

FIGURE 3 diagrammatically illustrates in side view a master tool having a recessed pattern therein with abrasive resist being applied thereto;

FIGURE 4 illustrates diagrammatically a transfer device by means of which the abrasive resist is removed from said master tool;

FIGURE 5 illustrates diagrammatically how the abrasive resist is supported on the transfer device;

FIGURE 6 illustrates diagrammatically how the abrasive resist is transferred to the acid resist coated product;

FIGURE 7 illustrates the substrate with the abrasive resist thereon and with the transfer device removed; and FIGURE 8 diagrammatically illustrates the details of an eroding device which can be employed in accordance with the invention.

Figure 1:
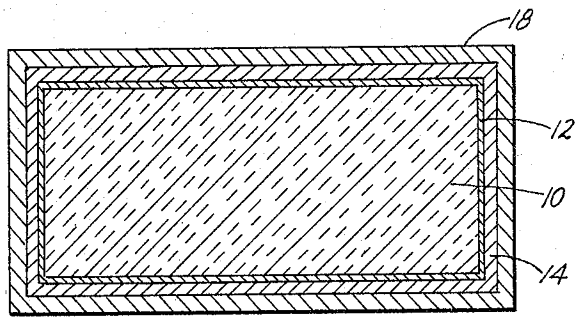
FIGURE 1 is a diagrammatic and cross-sectional view of a plated product into which a predetermined pattern is to be etched.

A typical problem with which the invention might be concerned is illustrated diagrammatically in FIG. 1 wherein is shown a body 10 made, for example, of a ceramic or ceramic-like material. The body 10 is in the form of a button and will be considered to be constituted by a fired and ground non-etchable substrate.

The body 10 being of a ceramic or a ceramic-like material is somewhat porous in nature. To provide a suitable substrate for plating the body 10 is therefore conventionally given a nickel coating of about .00005 to .0002 to remove the porosity therefrom. The technique for nickel plating a ceramic substrate is conventional per se and will be known to those skilled in the art.

Over the nickel plating 12 may be conventially deposited a coating 14 of a metal having suitable electrical characteristics. This metal may be selected from the group consisting of gold, silver, copper, platinum, and so forth. The thickness of this layer may be predetermined according to a wide variety of technical conditions and can be of any thickness adaptable to an etching technique, as will hereinafter be disclosed.

Figure 2:
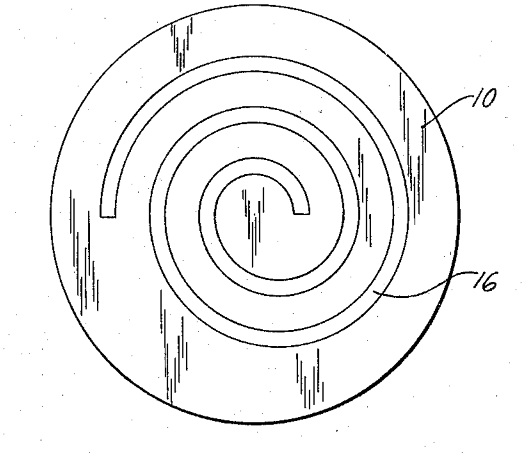
FIGURE 2 illustrates a pattern to be etched into the plating of the product of FIG. 1.

The problem which the invention treats with respect to an article of manufacture of the above noted type is to etch a pattern into the coating 14 with a chemical or caustic adapted for chemically eroding the material of said coating. FIG. 2 illustrates a pattern etched into the coating 14, there remaining a spiral 16 of gold positioned atop the ceramic substrate or body 10.

To enable a pattern of the nature indicated in FIG. 2 to be etched into the coating 14 shown in FIG. 1, there is contemplated a procedure in accordance with which the coating 14 is provided with an acid resist coating 18 which may be applied to the article 10 by dip coating or spraying, or any other technique suitable for mass production processes.

The acid resist employed for the coating 18 may be, for example, asphaltum or a microcrystalline wax. Alternatively, it has been found suitable to employ the photo-resists which have been heretofore employed in etching processes as acid resists which are selectively removed by wet photographic processes.

Such photo-resists are commercially available, but in the process of the invention they are employed in a manner wholly different from that intended in conventional processes.

As will be explained in greater detail hereinunder, the coating 18 is selectively removed by means of an abrasive which is directed at the coating 18 after the latter has been first covered by an abrasive resist applied thereto to form a master tool.

According to the preferred technique of the invention, it is contemplated that a master tool be provided in which is formed the negative of the etching desired. There are various procedures for forming such a master tool. For example, a black and white drawing of the master tool may be photographically copied and reduced to actual size. A tool blank of copper or engraver's brass is then polished and a photo-resist is placed on a flat surface thereof. This sensitized blank is exposed to actinic light through the photographic copy, the image being then developed and set by baking. The blank is then etched with a suitable etching material in conventional manner and the photo-resist is removed with a conventional remover such as phenol. Other conventional techniques for forming a master tool may also be employed such as, for example, pantograph engraving and so forth. The technique employed, however, must provide a recessed pattern of exact dimension and shape.

A tool 26 with a recessed pattern 28 therein is shown diagrammatically and in longitudinal section in FIG. 3. Pattern 28 corresponds to the pattern in FIG. 2. Also shown in FIG. 3 is a doctor blade 30 which is wiped across the upper surface 32 of said tool to deposit abrasive resist 34 in said recessed pattern.

The abrasive resist 34 may be any material adapted to resist erosion by an abrasive of determinable characteristics to be applied as hereinafter shown. A particularly advantageous resist which has been employed is a combination of polyvinyl chloride made into a viscous solution with a plasticizer such as dibutyl phthalate with a dye added so that the deposit in the recessed pattern can be readily checked. More particularly, an advantageous abrasive resist is formed by mixing, for example, 20 grams grams of Geon 121 (Goodrich Co.) with ½ ounce of dibutyl phthalate, 5 grams of a suitable dye solution being added to aid in inspecting the resist in contrast to clear open areas. Many other abrasive resists may also be employed.

With the abrasive resist in the recessed pattern in the master tool, the resist is set or cured by heat treatment and is then ready for transfer to the ceramic substrate illustrated in FIG. 1.

FIGURE 4 illustrates diagrammatically a transfer technique whereby a membrane 36 mounted on a supporting member 38 is employed to withdraw the shaped resist indicated by reference numeral 40 from the master tool. The membrane 36 and its support is preferably such that the abrasive resist can be transferred to the substrate without distortion.

More particularly, the transfer device may consist generally of a supporting section 38 in the form of a flat annular body of metal, cardboard, or the like having registration holes (not shown), the membrane consisting of cellophane which may be, for example, .001" thick. Other dimensionally stable membrane materials may also be employed. The membrane may be coated with a parting material, the purpose of which is to permit the subsequent deposition of the resist pattern on the substrate. The adhesive characteristics of the parting material will be discussed in further detail hereinafter, but may consist of a mixture of gum arabic, water and a preservative. For example, the parting material may consist of ½ gram sodium benzoate, ½ ounce of glycerine, 20 grams of gum arabic flakes and 16 ounces of water. These proportions are not critical and may be varied in accordance with the requirements of the other materials employed, as will become apparent hereinafter.

FIGURE 5 illustrates the supporting body 38 with the membrane 36 thereon, a layer 46 of parting material covering the membrane 36 and a layer 48 of adhesive covering the parting layer 46. The abrasive resist pattern 40 is indicated as adhering to adhesive layer 48.

The affinity of the abrasive resist for adhesive 48 must be greater than the affinity of the abrasive resist for the master tool. Similarly, the affinity of the parting material 46 for membrane 36 and for adhesive layer 48 must be greater than the affinity of the abrasive resist for said master tool. Further, the adhesive which bonds membrane 36 to support 38 must have a greater affinity for these members than said abrasive resist has for the master tool.

Various adhesives may be employed to remove the abrasive resist from the master tool. Preferably, this adhesive should be transparent and not an abrasive resist in itself. It must also serve as a transfer support. For this purpose, chlorinated rubber has been successfully used to constitute layer 48. More particularly, Parlon (which is chlorinated rubber) dissolved in toluol in a proportion of 15 grams per 4 ounces of solvent has proved very successful. Parlon can be purchased from the Hercules Powder Company.

In FIG. 6 is illustrated the support 38 and the membrane 36 thereon. Also illustrated is the parting layer 46 and the adhesive layer 48 with the resist pattern 40 thereon. The workpiece or substrate 10 is shown resting on a centralizing nest 50. Atop the workpiece 10 is positioned an adhesive layer 52.

A variety of adhesives may be employed to constitute the layer 52 as long as they have a greater affinity for the abrasive resist 40 than the parting material in layer 46 has for the membrane 36 so that the brasive resist pattern 40 is bonded by the layer 52 to the workpiece 10. A particularly suitable adhesive is a solution of modified vinyl chloride acetate in methyl ethyl ketone in a ratio of about 10 grams for each 4 ounces of the solvent.

FIG. 7 shows the workpiece 10 with the adhesive layer 52 bonding the resist pattern 40 thereto. Adhesive layer 48 and parting layer 46 are superposed on the abrasive resist, but are readily removed when an abrasive is propelled at the workpiece as will be indicated in greater detail hereinafter.

One type of eroding device for treating the thusly prepared piece is illustrated in FIG. 8. In FIG. 8, workpiece 10 mounted on work holder 100 is rotated by a shaft 102 and a motor 104. A chamber 106 is provided with an abrasive 108 which is preferably 150–180 grit silicon carbide or aluminum oxide. Feeding into the chamber 106 is an air tube 110 terminating adjacent the bottom venturi section 112 of nozzle 114. A skirt base 116 is coupled by a coupling nut 118 to the nozzle and there are additionally provided a number of venting pipes 120 which extend above the upper level of the abrasive. A take-away or evacuating conduit 122 is provided along with a supply conduit 124.

The erosion device illustrated in FIG. 8 is an upshot ejector assembly wherein a self-contained supply of abrasive is hopper fed into a low pressure area beneath the skirt 116. The low pressure created by the controlled flow of air through the venturi section 112 results in a controlled flow of abrasive, the flow propelling the abrasive vertically upwards against the workpiece which is held in position directly in line with or offset relative to the "hot spot" of the abrasive stream, the workpiece being rotated, or not, as desired, by the motor 104.

The intensity of the impinging stream of abrasive is controlled by the ratio of input air pressure and "take-away" vacuum. Depending upon the material to be eroded, the abrasive is propelled at the workpiece to impact against the same with velocities ranging from about 50–1500 feet per second.

It will be appreciated that what is eroded into the acid-resist coating on the workpiece or article of manufacture is the negative of the abrasive resist pattern. In other words, those portions of the coating which are left exposed by the abrasive resist are those portions which are eroded.

Referring again to FIG. 1, it will be recalled that the article or substrate 10 is provided with a nickel coating 12 which eliminates porosity and upon which is deposited a plating 14 of gold or the like. Further it will be recalled that on top of the coating 14 is provided a coating of acid resist which is employed to control the chemical erosion of the gold.

It will now be appreciated from what has been stated above that a pattern of abrasive is applied over the coating 18 whereafter an abrasive is propelled at the coating 18 to mechanically remove, abrade, or erode that portion of the coating 18 which remains exposed.

Thereafter, the article 10 is subjected to a caustic such as aqua regia or the like which attacks that portion of the coating 14 which is not covered by the remaining portion of the coating 18.

In contrast to known procedures which involve exposing each of a multiude of articles 10 to a source of light through a photographic negative, the invention requires only the preparation of a single master tool which can be adapted for processing a large number of articles simultaneously. Thus, only one photographic step is essential.

Additionally, it has been found that the technique of propelling an abrasive at a multitude of articles having previously been covered with respective patterns of abrasive resist is a much more efficient and economical method of selectively removing acid resists than the wet techniques heretofore employed.

There will now be obvious to those skilled in the art many modifications and variations of the method set forth above. These modifications and variations will not, however, depart from the scope of the invention if defined by the following claim.

What is claimed is:

A method comprising nickel plating a ceramic body to eliminate the porosity of said body, applying a layer of gold to the thusly plated body, coating the gold with a layer of acid resist adapted for resisting aqua regia, covering a portion of the layer of acid resist with a layer of abrasive resist and leaving exposed a portion of the layer of acid resist corresponding to a portion of gold therebeneath which is to be removed from the plated ceramic body, propelling an abrasive at the thusly prepared body to erode the exposed acid resist therefrom, and applying aqua regia to the thusly exposed gold to remove the same from said body; the covering of the acid resist with abrasive resist being effected by: etching in a metal tool a pattern which is the negative of the pattern of gold which is to be removed, filling said pattern with said abrasive resist, curing the thusly formed abrasive resist to adapt the same for transfer, and removing the thusly cured abrasive resist, and transferring it onto the layer of acid resist.

References Cited by the Examiner

UNITED STATES PATENTS

| | | | |
|---|---|---|---|
| 315,021 | 4/1885 | Graham | 156—10 |
| 1,709,048 | 4/1929 | Weidlich et al. | 156—10 |

FOREIGN PATENTS

| | | |
|---|---|---|
| 89,146 | 10/1896 | Germany. |
| 444,079 | 1/1949 | Italy. |

JACOB H. STEINBERG, *Primary Examiner.*

ALFRED WYMAN, *Examiner.*